United States Patent Office 3,439,110
Patented Apr. 15, 1969

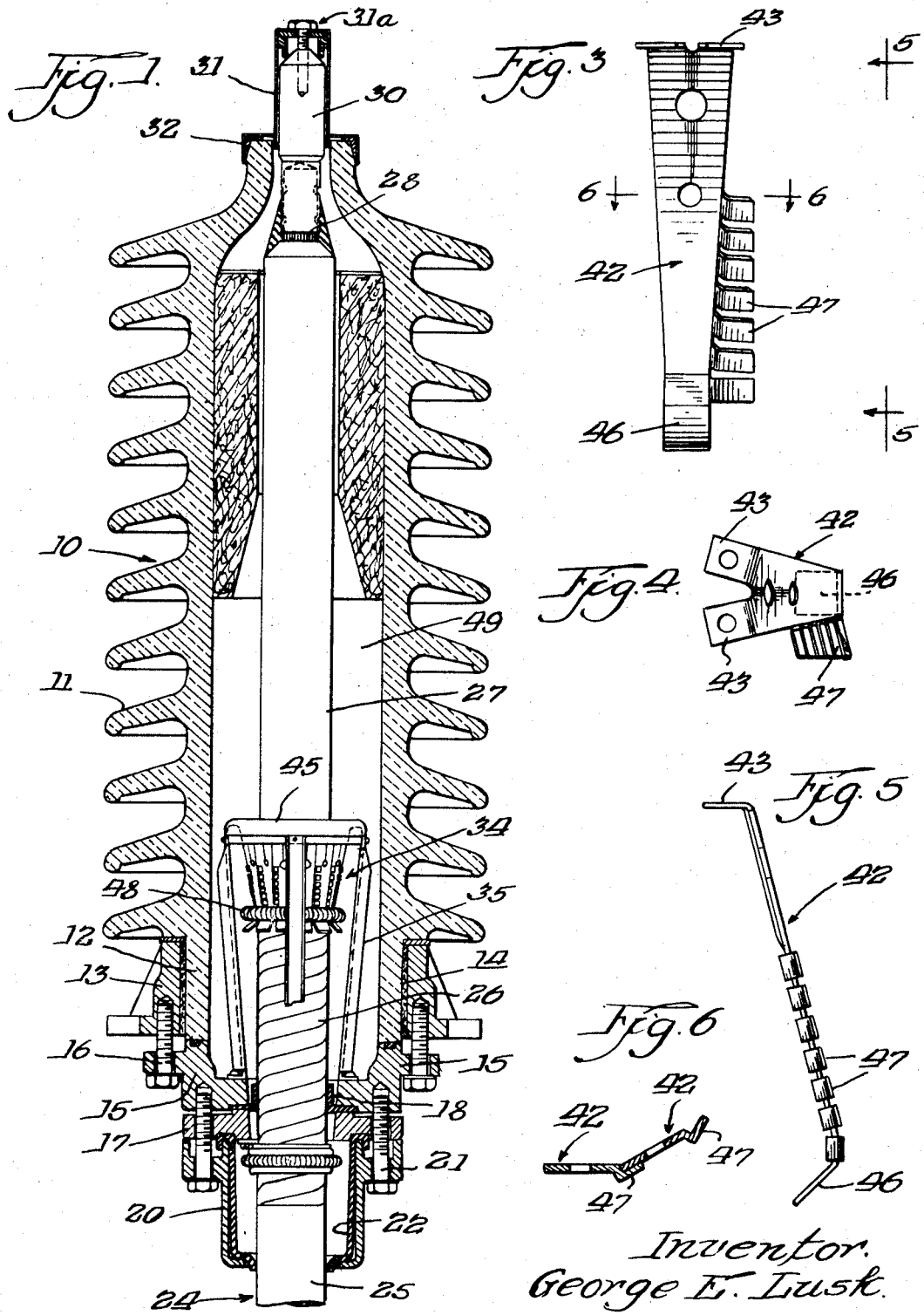

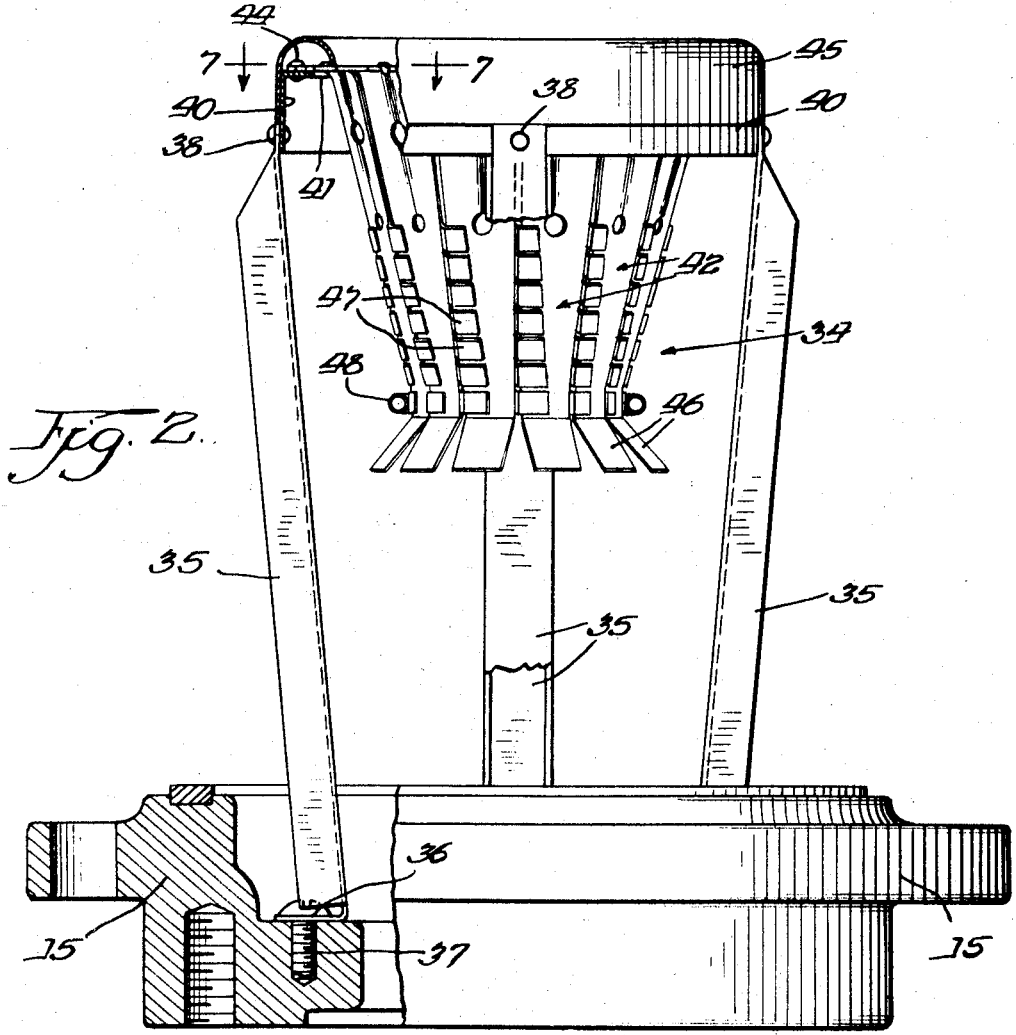
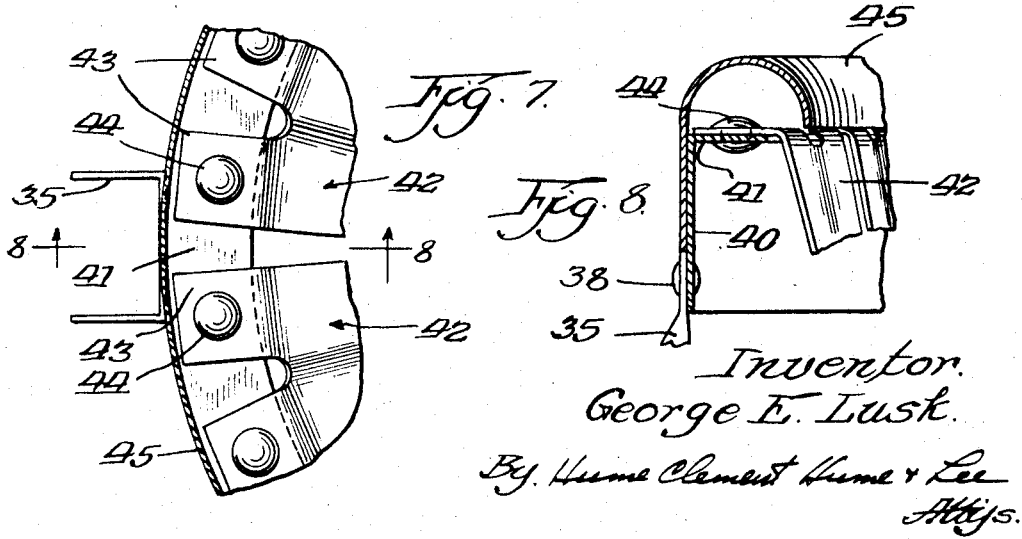

3,439,110
PREFABRICATED STRESS CONTROL SHIELD
George E. Lusk, Downers Grove, Ill., assignor to G & W Electric Specialty Company, Blue Island, Ill., a corporation of Illinois
Filed June 4, 1968, Ser. No. 734,491
Int. Cl. H02g 3/00, 1/14
U.S. Cl. 174—73     7 Claims

ABSTRACT OF THE DISCLOSURE

The stress control shield of the invention is prefabricated of metal having some resiliency and the same is suitably supported within a cable terminator. The stress control shield essentially consists of a plurality of fingers which depend from a supporting ring. Each finger is formed with a plurality of tabs along one longitudinal edge and which overlap the finger adjacent to the tabs.

---

The invention relates to cable termination systems and has reference more particularly to a prefabricated stress control shield capable of improved expansion and which will satisfy all requirements for shielded cable terminators in addition to providing the required dielectric stress control for all expanded positions of the stress control shield for a considerable range of power cable diameters.

The hand wrapped stress relief cones as previously employed in high voltage power cables reinforced the dielectric strength of the insulation of the termination system by the addition of dielectric volume and modification of the electric field. The stress relief cones modified the dielectric field at the terminal edges of the power cable shield in such a manner as to reduce the magnitude of the longitudinal voltage gradients that existed at these edges.

The metallic preformed expandable shield system as disclosed in the Lusk Patent 3,322,883, granted May 30, 1967, provided the function of the hand applied stress relief cone while eliminating the need for skilled installers. The use of this expandable stress control shield also materially reduced the time required for the complete installation of the cable terminators.

In order to simplify the field installation of a high voltage power cable terminator, it is necessary to incorporate a dielectric stress control device within the terminator. The device must satisfy a number of requirements in addition to providing the dielectric stress control normally associated with shielded cable terminators.

One such requirement is that the stress control shield must compensate for a considerable range of power cable diameters. The shield must also apply minimal radial pressure on cable installations, some of which may have poor rheological characteristics, and yet have sufficient recovery force to maintain physical contact with the cable overshield in its final alignment position.

The stress control shield must also provide for a reasonable dimensional tolerance in the actual location at the end of the semi-conducting or metallic shielding system of the cable, and said shield must also be capable of accepting the entry of the connector-cable assembly as it is inserted into the terminator.

In the use of the expandable stress control shield as shown in Patent 3,322,883 the fingers are caused to deflect upon the insertion of the larger cables and this expansion which increases the spacing between the fingers introduces a tangential voltage gradient component in the dielectric field adjacent to the interface between the shield fingers and the cable insulation. The magnitude of this tangential gradient that can be safely accepted by the dielectric insulation environment involved thus becomes the limiting factor on how large a cable diameter a given shield design will accommodate.

Accordingly an object of the invention is to provide an improved stress control shield that can be prefabricated, a stress control shield which will be expandable for accommodating a range of cable diameters, and a stress control shield which will be especially designed to avoid the unshielded spacing or window gap effects, whereby the uneven and high stresses at the terminus of the cable semi-conducting jacket or metallic shield system are eliminated.

Another object of the invention is to provide a metal stress control shield having a plurality of expandable fingers and wherein each said finger has a feathered surface along one edge so formed and shaped as to overlap an adjacent finger.

A further object of the invention resides in the provision of an expandable stress control shield essentially comprising a plurality of fingers and wherein tabs are formed along one edge of each finger for overlapping relation with an adjacent finger.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a longitudinal sectional view of a terminator assembly showing a cable termination system incorporating the improved stress control shield of the invention;

FIGURE 2 is a fragmentary elevational view on an enlarged scale, parts being shown in section, of the complete stress control shield together with the supports for the same;

FIGURE 3 is an elevational view showing a finger of the stress control shield;

FIGURE 4 is a top plan view of the finger shown in FIGURE 3;

FIGURE 5 is a side elevational view of the finger of FIGURE 3 taken substantially along line 5—5 of said figure;

FIGURE 6 is a sectional view taken substantially along line 6—6 of FIGURE 3;

FIGURE 7 is a detail sectional view on an enlarged scale taken substantially along line 7—7 of FIGURE 2; and FIGURE 8 is a detail sectional view taken substantially along line 8—8 of FIGURE 7.

FIGURE 1 shows the invention as applied to a termination assembly for a solid dielectric insulated cable whereeinin the numeral 10 indicates an insulator formed of any suitable material such as ceramic and having the outwardly projecting skirts 11 and the cylindrical base portion 12. The supporting ring 13 of metal telescopes the base portion 12 and the same is fixedly secured thereto by cementing material 14 or the like. The closure ring 15 also of metal is secured to the supporting ring 13 by the securing screws 16 and the said closure ring 15 together with the clamping ring 17 form the clamping members for the elastomeric seal 18. The enclosing cup 20 is in turn releasably secured to the closure ring 15 by the securing screws 21 which pass through openings in the clamping ring 17 and have threaded relation in the closure ring 15. The said screws 21 therefore join the enclosing cup 20 to the clamping ring 17 and also join the combined unit to the closure ring 15 with the elastomeric seal 18 being clamped in place between the two metal rings. The inside of the enclosing cup is preferably lined with elastomeric material 22 and which provides an upper edge that is clamped between the cup and the ring 17, and the material 22 also provides a seal on the outer cable jacket 25.

The cable 24 extends into the termination assembly and the bare copper conductor of the cable is electrically connected to a terminal part at the top end of the insulator. FIGURE 1 shows the cable as having the outer jacket 25, the cable shielding tapes 26, and the solid dielectric cable insulation 27. The terminal end of the cable is further stripped of its insulation to expose the copper or aluminum wires 28 which form the cable conductor. By means of the metal connector 30 the bare end 28 of the power cable is electrically connected to the metal cap 31 by a bolt 31a, the metal cap 31 providing the exterior electrical connecting means for the cable. The gasket 32 which is confined between the metal cap 31 and the insulator 10 functions to seal this end of the termination assembly. The terminator is filled with a suitable insulating compound 49.

In accordance with the invention, the improved stress control shield indicated in its entirety by the numeral 34 is supported by the legs or supports 35 on the closure ring 15. As shown in FIGURE 2 each leg has a bent flange 36 at its base which is secured to the closure ring 15 by the securing screw 37. The top end of each supporting leg is suitably secured as by the rivet 38 to the depending flange 40 of a supporting ring which also provides the horizontal flange 41, FIGURE 8.

The control shield of the invention essentially consists of a plurality of fingers 42 as best shown in FIGURE 3 and which have a pair of bent securing flanges 43 at their top ends. The flanges are riveted at 44 to the horizontal flange 41 for suspending the fingers from the supporting ring. The cover ring 45 has interfitting relation with the flange 40 and the arcuate portion of the cover ring overlies the flanges 43 and the rivets 44 of the finger attaching structure.

Each finger 42 may be formed from a single strip of spring metal by simple stamping and bending operations. At the lower end of each finger the same has a portion 46 which is bent in the same direction as the top supporting flanges 43. However, considering the manner in which the fingers are arranged around the inside periphery of the supporting ring, this produces an outwardly flaring portion 46 for each finger all as clearly illustrated in FIGURE 2.

An additional characteristic feature of the fingers as contemplated by the invention resides in the provision of the tabs 47 along one longitudinal edge. The tabs 47 are integral with their respective finger and it will also be observed that the tabs increase in length in a downward direction so that the bottom tab adjacent the portion 46 is the longest. This is necessary in order that the bottom tabs will maintain their overlapping contact with an adjacent finger when the stress control shield is fully expanded by the insertion of a cable of large size. This expansion of the fingers and the maintenance of some resilient pressure against the inserted cable is facilitated by the encircling coil spring 48. The coil spring encircles the fingers of the stress control shield immediately above the flaring portions 46. More particularly it can be stated that the coil spring has contact with the long bottom tabs of the fingers.

The tabs of each finger are preferably integral with the metal of the finger and each tab is bent outwardly from the finger and then angularly of the finger as shown in FIGURE 6 in order that the tabs of one finger will overlap an adjacent finger. The overlapping arrangement eliminates the variable gaps between each finger. The only remaining gap area between fingers is limited to the incisions made into each feathered edge for flexing and for hydraulic reasons.

When the prepared end of the cable 24 has been fully inserted within the terminator assembly, the stress control shield 34 will have contact with the insulation of the cable. More particularly the stress control shield will preferably contact the shielding tapes 26 or similar overshield material. The arcuate cover ring 45 is desired for higher voltage ratings. The smooth radius cover or cap helps to decrease the concentration of flux lines and equipotential lines and thus increases the puncture strength of the insulation in this high stress area.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a terminator device of the character as described, a cylindrical shell of insulating material having a cylindrical base portion, closure plate structure in fixed relation on the base portion of the cylindrical shell, said closure plate structure having a central opening for accommodating the prepared end of a power cable adapted to be inserted through the closure plate structure and into the cylindrical shell, a stress control shield within the cylindrical shell and being supported by the closure plate structure, said stress control shield including an annular arrangement of depending resilient fingers, whereby the prepared end of the power cable extends through the annular arrangement with the fingers being disposed around the periphery of the cable and in contact therewith, and each said finger having a feathered longitudinal edge and which has overlapping relation with the finger adjacent the said feathered edge.

2. A terminator device as defined by claim 1, wherein the prepared end of the cable is such as to expose the cable insulation, and wherein the fingers of the stress control shield have contact with said cable shielding system.

3. A terminator device as defined by claim 1, wherein the feathered longitudinal edge of each finger is formed by a plurality of tabs and which have overlapping relation with the finger adjacent the said tabs.

4. A terminator device as defined by claim 1, wherein the feathered longitudinal edge of each finger is formed by a plurality of tabs which increase in length downwardly of the finger with the longest tab being located adjacent the bottom of the finger, and the tabs of each finger having overlapping relation with the finger adjacent the said tabs.

5. In a terminator device of the character described, a cylindrical shell of insulating material having a cylindrical base portion, closure plate structure in fixed relation on the base portion of the cylindrical shell, said closure plate structure having a central opening for accommodating the prepared end of a power cable adapted to be inserted through the closure plate structure and into the cylindrical shell, a stress control shield within the cylindrical shell and being supported by the closure plate structure, said stress control shield including an annular arrangement of depending resilient metal fingers, whereby the prepared end of the power cable extends through the annular arrangement with the fingers being disposed around the periphery of the cable and in contact therewith, a circular base member to which the upper end of each finger is secured, and each said finger having a plurality of tabs along one longitudinal edge and which have overlapping relation with the finger adjacent the said tabs.

6. A terminator device as defined by claim 5, additionally including an annular top cover member which has interfitting relation with the circular base member and which provides an arcuate cover disposed over the top connections of the fingers with the base member.

7. A terminator device as defined by claim 5, wherein the tabs on each finger increase in length downwardly with the longest tab being disposed adjacent the bottom of the finger.

References Cited

UNITED STATES PATENTS

| | | | |
|---|---|---|---|
| 2,363,295 | 11/1944 | Cotter | 200—163 |
| 2,957,971 | 10/1960 | Buttrey et al. | |
| 3,322,883 | 5/1967 | Lusk | 174—73 |

FOREIGN PATENTS 1,263,085  4/1961  France.

LARAMIE E. ASKIN, *Primary Examiner.*

U.S. Cl. X.R.

174—19; 339—259